(12) United States Patent
Leuthold

(10) Patent No.: US 9,196,294 B2
(45) Date of Patent: Nov. 24, 2015

(54) APPARATUS WITH REPULSIVE FORCE BETWEEN STATIONARY AND ROTATABLE COMPONENTS

(71) Applicant: Seagate Technology LLC, Cupertino, CA (US)

(72) Inventor: Hans Leuthold, Santa Cruz, CA (US)

(73) Assignee: Seagate Technology LLC, Cupertino, CA (US)

( * ) Notice: Subject to any disclaimer, the term of this patent is extended or adjusted under 35 U.S.C. 154(b) by 60 days.

(21) Appl. No.: 14/101,195

(22) Filed: Dec. 9, 2013

(65) Prior Publication Data

US 2015/0162046 A1      Jun. 11, 2015

(51) Int. Cl.
*G11B 19/20*      (2006.01)
*H02K 7/08*      (2006.01)
*H02K 17/16*      (2006.01)

(52) U.S. Cl.
CPC ............ *G11B 19/20* (2013.01); *G11B 19/2036* (2013.01); *G11B 19/2009* (2013.01); *H02K 7/085* (2013.01); *H02K 17/165* (2013.01)

(58) Field of Classification Search
USPC ....................................................... 360/99.08
See application file for complete search history.

(56) References Cited

U.S. PATENT DOCUMENTS

| | | | | |
|---|---|---|---|---|
| 5,327,417 | A  * | 7/1994 | Tanaka et al. | 720/670 |
| 8,217,606 | B2 * | 7/2012 | Hyde et al. | 318/400.4 |
| 8,222,842 | B2   | 7/2012 | Hyde et al. | |
| 8,536,813 | B2   | 9/2013 | Hyde et al. | |
| 2008/0037405 | A1 * | 2/2008 | Fujita et al. | 369/283 |
| 2009/0108797 | A1 * | 4/2009 | Haas | 318/801 |
| 2011/0181930 | A1 * | 7/2011 | Sugita | 359/200.7 |

* cited by examiner

Primary Examiner — Wayne Young
Assistant Examiner — Carlos E Garcia

(57) ABSTRACT

Provided herein, is an apparatus that includes a fluid dynamic bearing, a hub, and an induction housing. The fluid dynamic bearing is defined by a stationary component and a rotatable component. The hub is configured to rotate relative to the stationary component. A current is induced within the induction housing resulting from the relative rotation. The induced current creates a repulsive force between the stationary component and the hub.

11 Claims, 8 Drawing Sheets

APPARATUS WITH REPULSIVE FORCE BETWEEN STATIONARY AND ROTATABLE COMPONENTS

BACKGROUND

Disk drives are capable of storing large amounts of digital data in a relatively small area. Disk drives store information on one or more recording media, which may take the form of circular storage disks having a number of concentric circular recording tracks. The disks are mounted on a rotating component (e.g. a hub), and rotate relative to a stationary component (e.g. stator, base, etc.). The information is written to and read from the rotating disks using read/write heads mounted on actuator arms that are moved from track to track across the surfaces of the disks by an actuator mechanism. Over the years, storage density has increased, and the size of the storage system has decreased.

SUMMARY

Provided herein, is an apparatus that includes a fluid dynamic bearing, a hub, and an induction housing. The fluid dynamic bearing is defined by a stationary component and a rotatable component. The hub is configured to rotate relative to the stationary component. A current is induced within the induction housing resulting from the relative rotation. The induced current creates a repulsive force between the stationary component and the hub.

These and other features and advantages will be apparent from a reading of the following detailed description.

BRIEF DESCRIPTION OF DRAWINGS

Various embodiments are illustrated by way of example, and not by way of limitation, in the figures of the accompanying drawings and in which like reference numerals refer to similar elements.

DETAILED DESCRIPTION

Figure 1A:
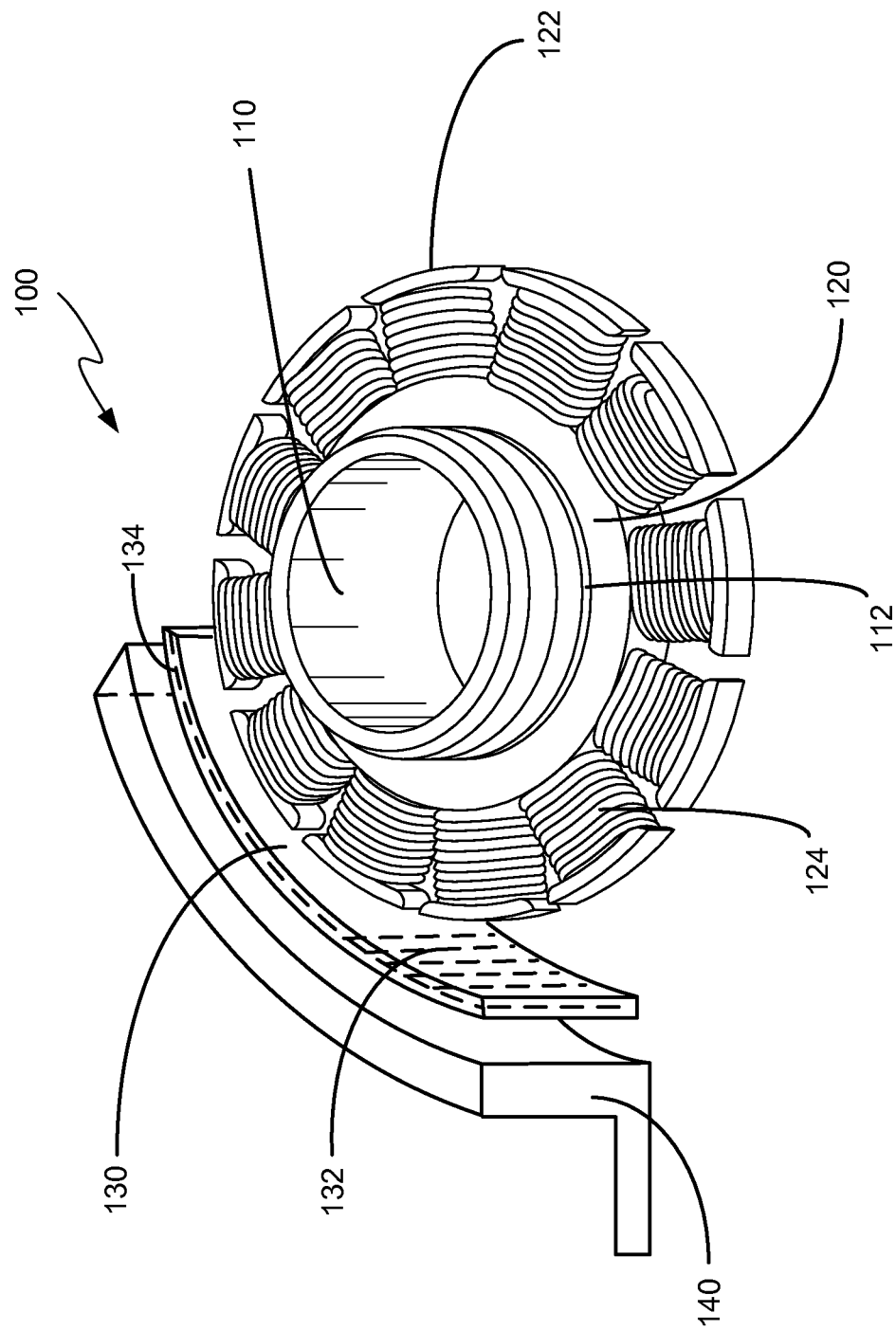
FIG. 1A illustrates an exploded view of a fluid dynamic bearing motor with an induction housing according to one embodiment.

Before various embodiments are described in greater detail, it should be understood that the embodiments are not limited to the particular embodiments described and/or illustrated herein, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

For many years, synchronous motors (also known as brushless DC, permanent magnet, spindle motor) have been used in hard drive technology. In synchronous motors, an attraction force is created between the stator and the permanent magnet when current passes through the stator windings. The attraction force that is created reduces stiffness, therefore resulting in sub-optimal performance.

In order to improve and optimize performance of a hard drive, the permanent magnet of the synchronous motor may be replaced with an induction housing (also referred to as a "squirrel cage" in this application). The induction housing may include a plurality of wires. Current may be induced within the plurality of wires of the induction housing in response to relative rotation of the induction housing in a generated magnetic field by the stator. The induced current thus generates a magnetic field associated with the plurality of wires and a force associated therewith. In comparison, the stator generates a magnetic field and a force associated therewith. The force associated with the plurality of wires is repulsive (as opposed to the attractive force in a synchronous motor described above) with respect to the force associated with stator. As a result, stiffness is increased and hard drive performance is improved and optimized.

More specifically, within an asynchronous motor current is induced in response to a component, e.g., induction housing, rotating with respect to a stationary component, e.g., stator, and further in response to a magnetic field generated by the stationary component. For example, a current may originate within a stator having a magnetic field and a force associated therewith. As a result, a hub may start spinning. In one embodiment, the induction housing may be coupled to the hub and start spinning once the hub rotates. The relative motion of the magnetic stator field with respect to the induction housing, comprising a plurality of wires induces a current within the plurality of wires. This induced current then generates an electromagnetic field and a force associated therewith. The force includes a tangential component that generates the torque that rotates the hub. The force also includes a radial component that pushes away from the surface of the stator. As such, the force associated with the induced current is repulsive with respect to the force associated with the stator. As such, the repulsive force pushes the hub and stator against one another, thereby increasing the stiffness and stability within the asynchronous motor of the disk drive system.

The various embodiments will now be described in greater detail.

According to an embodiment, FIG. 1A illustrates a fluid dynamic bearing motor 100 with an induction housing according to one embodiment. The fluid dynamic bearing motor 100 includes a shaft 110, a sleeve 112, a stator assembly 120, an induction housing 130, and a hub 140. The induction housing 130 is positioned between the hub 140 and the stator assembly 120 and forms an inner fluid bearing gap with the stator assembly 120 and an outer magnetic gap with the hub 140. The induction housing 130 and the stator assembly 120 are configured to operate as an asynchronous motor (also referred to as a squirrel cage motor, or a linear motor). It is appreciated that the induction housing 130 may also be referred to as a squirrel cage, in one embodiment, and may include a plurality of wires 132 encased within the induction housing 130. The plurality of wires 132 may be coupled to one another via a top shoring ring 134 and bottom shorting ring (not shown).

The stator assembly 120 may include a number of stator teeth 122 along with a series of windings 124. When current flows in the windings 124, the hub 140 rotates. The hub 140 is coupled to the induction housing 130, which also starts rotating when the hub 140 rotates. However for clarity of illustration, the housing 130 is illustrated as detached from the hub 140.

The current flowing through the windings 124 has a corresponding electromagnetic field and a force. It is appreciated that the stator assembly 120 has a number of stator poles corresponding to the number of periods of the rotating magnetic field generated by the current flowing through the N phase stator winding 124. Relative rotation of the wires 132 in the induction housing 130 with respect to the stator assembly 120 induces a current within the wires 132. The induced current within the wires 132 has an electromagnetic field and a force associated therewith. The force associated with the induced current within the induction housing 130 is repulsive with respect to the force associated with the stator assembly 120. The repulsive force causes the stator assembly 120 and the hub 140 that is attached to the induction housing 130 to push off against one another, thereby increasing stiffness and stability of the fluid dynamic bearing motor 100.

According to one embodiment, the sleeve 112 and the shaft 110 are positioned on an inner diameter of the stator assembly 120. A bearing gap formed between the sleeve 112 and the shaft 110 may include various grooves and one or more fluid dynamic bearings. The grooves and fluid dynamic bearings create various areas of high pressure, thereby causing areas of increased pressure within the bearing gap, as well as causing fluid to circulate. According to some embodiments, the sleeve 112 may rotate with the hub 140 and the shaft 110 may be stationary. According to other embodiments, the shaft 110 may rotate with the hub 140 and the sleeve 112 may be stationary.

According to one embodiment, an electromagnetic gap is located between the stator assembly 120 and the induction housing 130, and a bearing gap is located between the shaft 110 and the sleeve 112. The electromagnetic gap is radially outward of the stator assembly 120, and the bearing gap is radially inward of the stator assembly 120. The electromagnetic gap and the bearing gap both provide increased angular and radial stiffness to the fluid dynamic bearing motor 100, relative to their positioning within the fluid dynamic bearing motor 100.

According to one embodiment the number of wires 132 may be related to the number of poles of the stator winding 124. It is further appreciated that vertical placement of the wires 132 in the induction housing 130 is exemplary and not intended to limit the scope of the embodiments. For example, in some embodiments the wires 132 may not be vertical, e.g., slanted, etc. In further embodiments, the wires 132 may form patterns (e.g. chevron, herringbone, etc.). The patterns may create areas of increased pressure within the bearing, as well as causing fluid to circulate. It is appreciated that the induction housing 130 may be formed of a conductive sheet of material, e.g., a layer of copper on a magnetic steel sheet, a layer of aluminum on a magnetic steel sheet, etc., instead of the number of wires 132, according to some embodiments. According to some embodiments, the induction housing 130 may be formed using electro-chemical machining process.

Figure 1B:
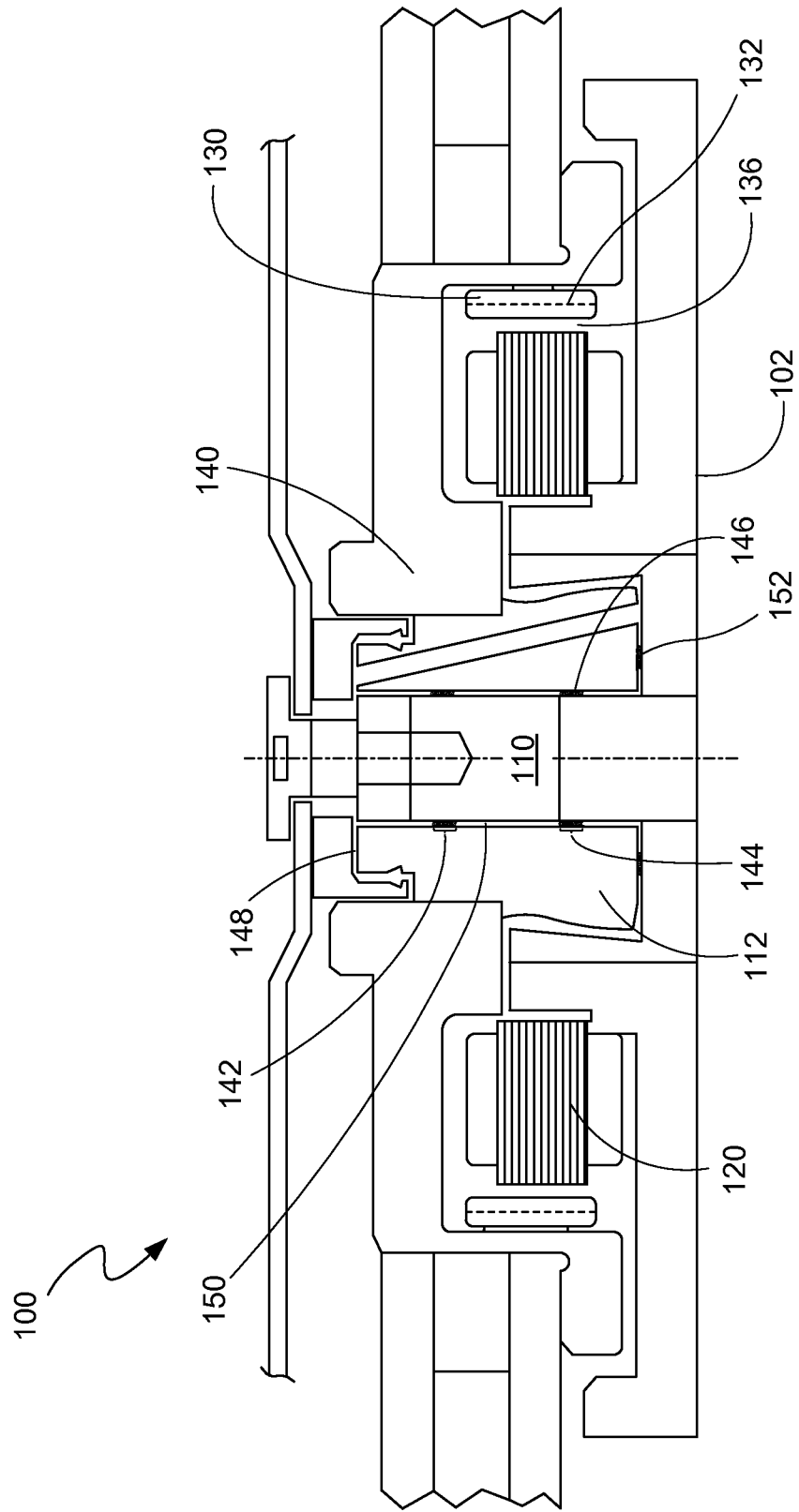
FIG. 1B illustrates a cross-sectional view of a fluid dynamic bearing motor with the induction housing according to one aspect of the embodiments.

FIG. 1B illustrates a fluid dynamic bearing motor 100 with an induction housing according to one embodiment. The fluid dynamic bearing motor 100 may include a rotatable sleeve 112 and a hub 140 configured for rotation about a stationary shaft 110, according to some embodiments. However, according to various other embodiments (not shown), a rotatable shaft and hub may rotate with respect to a stationary sleeve. The fluid dynamic bearing motor 100 includes a bearing gap 150 defined by rotatable components (e.g. sleeve 112, hub 140, etc.) and stationary components (e.g. shaft 110, base 102, etc.). The bearing gap 150 is disposed on an inner diameter of the stator assembly 120.

Furthermore, an upper journal bearing 142 and a lower journal bearing 144 may be disposed within the gap 150. A series of groove(s) 146 may be formed on the shaft 110 and/or the sleeve 112 within one or more journal bearings (e.g. an upper journal bearing 142 and/or a lower journal bearing 144). Various embodiments may further include one or more thrust bearings 152 and/or one or more limiter bearings 148. Thus, the fluid dynamic bearings (journal bearings, thrust bearings, limiter bearings, etc.) provide stiffness in steady state operational environments as well as during shock events, thereby increasing overall system stability and robustness.

According to some embodiments, the stator assembly 120 and the induction housing 130 containing a number of wires 132 are located radially outside of the bearing gap 150. Thus, the stator assembly 120 and the wires 132 define an electromagnetic gap 136 therebetween. As discussed above, the interaction between the stator assembly 120 and the wires 132 generates a repulsive force that increases the stiffness of the fluid dynamic bearing motor 100.

Figure 2:
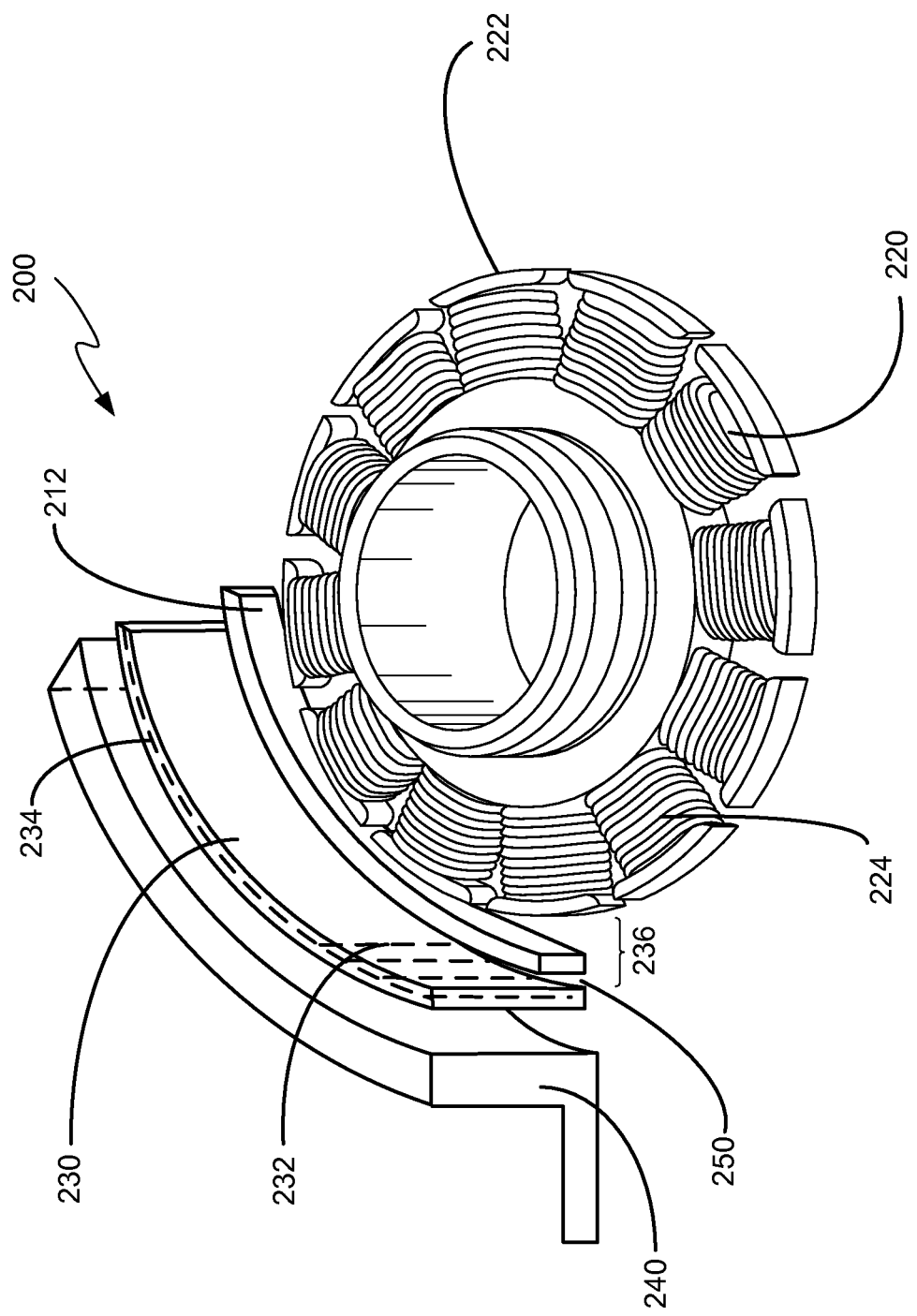
FIG. 2 illustrates an exploded view of a fluid dynamic bearing motor with an induction housing positioned within a magnetic gap according to one aspect of the embodiments.

FIG. 2 illustrates a fluid dynamic bearing motor 200 with an induction housing positioned within a magnetic gap according to one embodiment. The fluid bearing motor 200 operates in a similar fashion to the motor 100 described in FIG. 1. However according to the present embodiment, a sleeve 212 is positioned radially outside of a stator assembly 220. Thus, a bearing gap 250 is now located radially outside of the stator assembly 220, as opposed to the bearing gap 150 (FIG. 1B) that is located radially inside the stator assembly 120 (FIG. 1B).

Similar to the electromagnetic gap 136 (FIG. 1B), an electromagnetic gap 236 is located radially outside of the stator assembly 220. The electromagnetic gap 236 is defined between the stator assembly 220 and wires 232. An induction housing 230 is mounted to a hub 240 and encases the wires 232. The hub 240, housing 230, and wires 232 all rotate in response to magnetic fields generated by stator teeth 222 and stator windings 224 of the stator assembly 220. The rotation of the wires 232 with respect to the stator 220 and its magnetic field induces current within the wires 232. The induced current generates a magnetic field and a force associated with the induction housing 230. The force associated with the induction housing 230 is repulsive with respect to the force associated with the magnetic field of the stator 220. Accordingly, a repulsive force is generated between the stator assembly 220 and the wires 232.

By positioning the sleeve 212 radially outside of the stator assembly 220, a fluid dynamic bearing gap may be formed between the sleeve 212 and the induction housing 230. The bearing gap between the sleeve 212 and the induction housing 230 may include grooves and bearings. The grooves may be formed on the sleeve 212 and/or the induction housing 230. In other words, the sleeve 212 and the stator assembly 220 may form a unit with its associated outer surface forming the inside portion of the electromagnetic gap and the bearing gap. According to another embodiment, the bearing gap may be formed between the sleeve 212 and the stator assembly 220. The groove(s) provide an additional stiffness to the fluid dynamic bearing motor 200 during operation and/or create fluid circulation.

Figure 3:
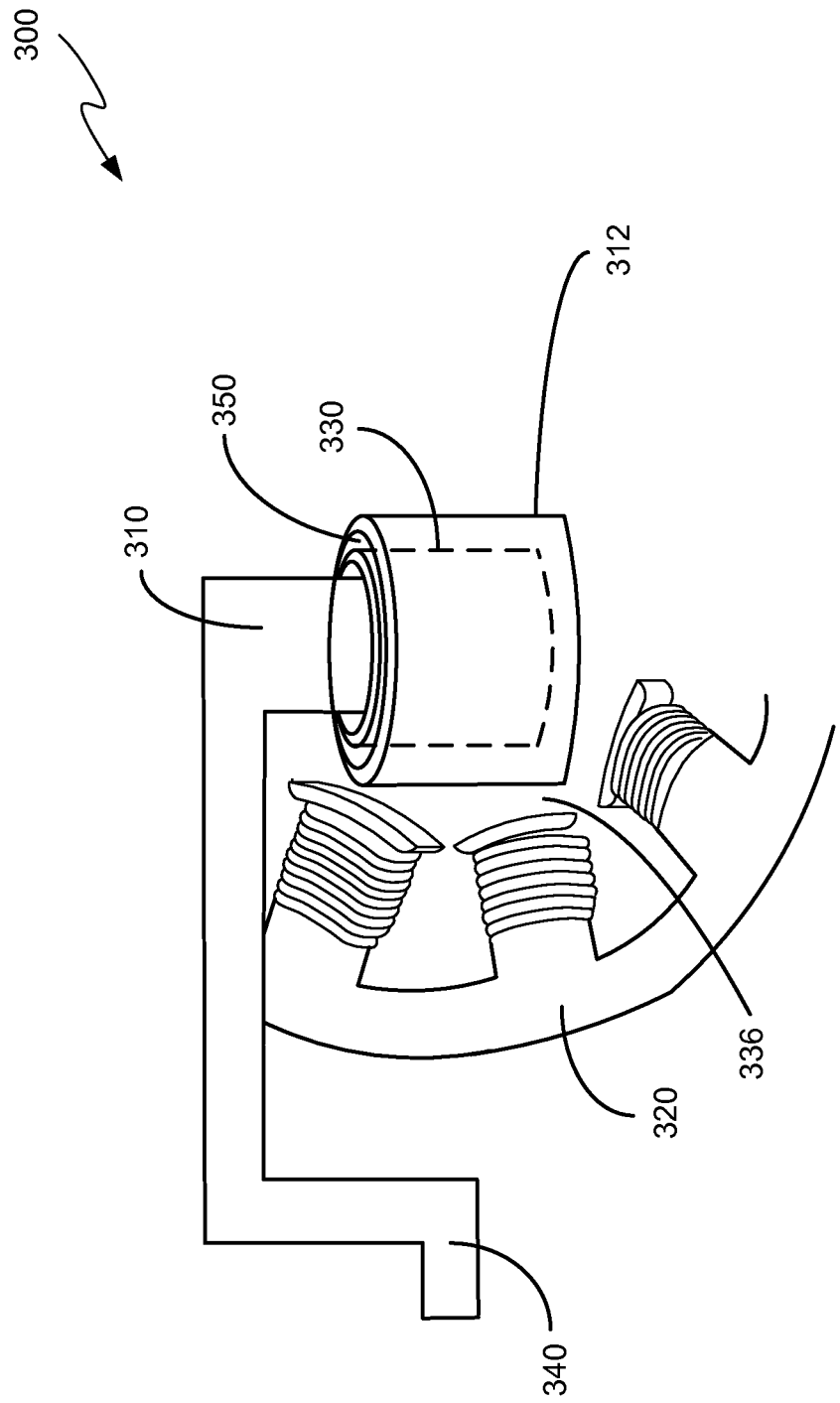
FIG. 3 illustrates an exploded view of a fluid dynamic bearing motor with an induction housing positioned within a bearing gap according to one aspect of the present embodiments.

FIG. 3 illustrates a fluid dynamic bearing motor 300 with an induction housing positioned within a bearing gap according to one embodiment. The fluid dynamic motor 300 operates in a similar fashion to the motor 100 described in FIG. 1. However according to the present embodiment, both a sleeve 312 and an induction housing 330 are positioned radially inside of a stator assembly 320. Thus, both a bearing gap 350 and an electromagnetic gap 336 are both now located radially inside of the stator assembly 320, as opposed to the bearing gap 150 (FIG. 1B) located radially inside the stator assembly 120 (FIG. 1B) and the electromagnetic gap 136 (FIG. 1B) located radially outside of the stator assembly 120 (FIG. 1B).

In the present embodiment, the sleeve 312 is stationary, and the induction housing 330 rotates with a shaft 310 and hub 340. However in various embodiments (not shown), the shaft 310 may be stationary, and the sleeve 312 rotates with the housing 330 and the hub 340.

A fluid dynamic bearing gap may be formed between the sleeve 312 and the induction housing 330. The bearing gap between the sleeve 312 and the housing 330 may include grooves and bearings. The grooves may be formed on the sleeve 312 and/or the induction housing 330. The groove(s) provide an additional stiffness to the fluid dynamic bearing motor 300 during operation and/or create fluid circulation.

According to yet another embodiment (not shown), the components described above (e.g. sleeve, shaft, housing, stator, wires, hub, etc.) may be arranged such that a bearing gap is formed radially outside of the stator, and an electromagnetic gap is formed radially inside of the stator. Thus, a fluid dynamic bearing gap is formed between stationary components and rotatable components, located radially outside of the stator. In addition, the induction housing including the wires are located radially inside of the stator assembly.

Figure 4:
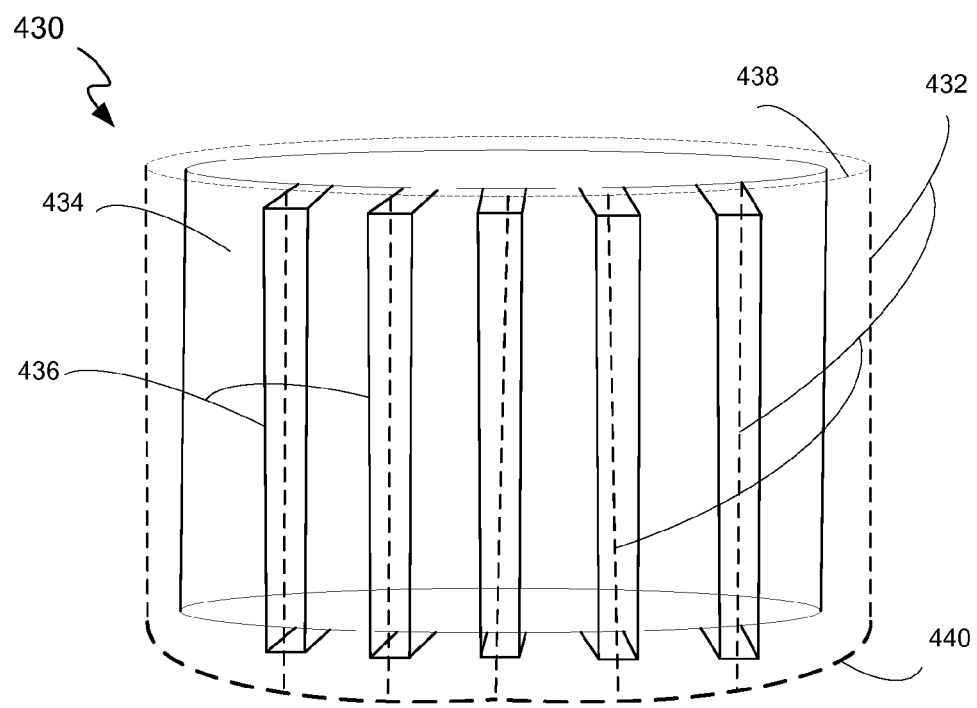
FIG. 4 illustrates an exemplary induction housing (squirrel cage) according to one aspect of the present embodiments.

FIG. 4 illustrates an induction housing 430 (squirrel cage) as illustrated in FIGS. 1-3. The induction housing 430 may be a squirrel cage motor, an asynchronous motor, linear motor, etc. The squirrel cage housing 430 includes a number of electrically conductive wires 432 surrounding a surface 434. The surface 434 may have multiple slots 436 formed thereon to attach to the number of wires 432. The number of wires 432, e.g., aluminum or copper wires, may be connected at both axial ends of the surface 434 by a top and bottom shorting ring 438, 440 forming a cage like shape structure. A current is induced in the wires 432 when the induction housing 430 rotates with respect to the stator assembly (shown in FIGS. 1-3). The induced current has an electromagnetic field and a force associated therewith.

In various embodiments, the squirrel cage housing 430 may include any number of wires regardless of the number of stator poles (e.g. a single phase motor, a two phase motor, a three phase motor, a four phase motor, etc.). The phases of the motor may vary based on design needs, thereby creating an effective rotating field within the fluid dynamic bearing motor. The rotating field may produce an electromagnetic field and a force associated therewith.

Figure 5:
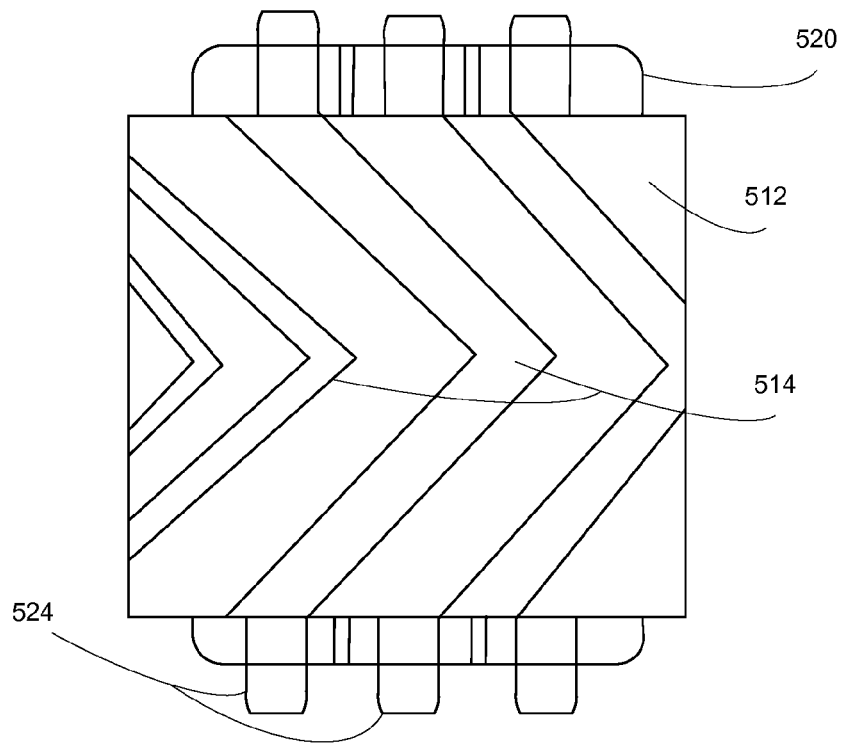
FIG. 5 illustrates a stator assembly forming a bearing gap according to one aspect of the present embodiments.

FIG. 5 illustrates a stator assembly 520 forming a bearing gap according to one embodiment. The stator assembly 520 includes a number of windings 524 facing an inner diameter of a sleeve 512. The bearing gap and the magnetic gap may be colligated. The stator assembly 520 may be molded, for instance according to U.S. Pat. No. 8,033,731, if the bearing gap and the magnetic gap are colligated. The stator assembly 520 generates a magnetic field in response to an electric current flowing through its windings 524. The magnetic field of the stator assembly 520 has a force associated therewith. In one embodiment, the sleeve 512 may be, a plastic shell containing a smooth bearing surface with one or more grooves 514 disposed thereon. The grooves 514 may be configured to pump fluid throughout the fluid dynamic bearing motor and generate pressure that increases the angular stiffness of the bearing.

Figure 6A:
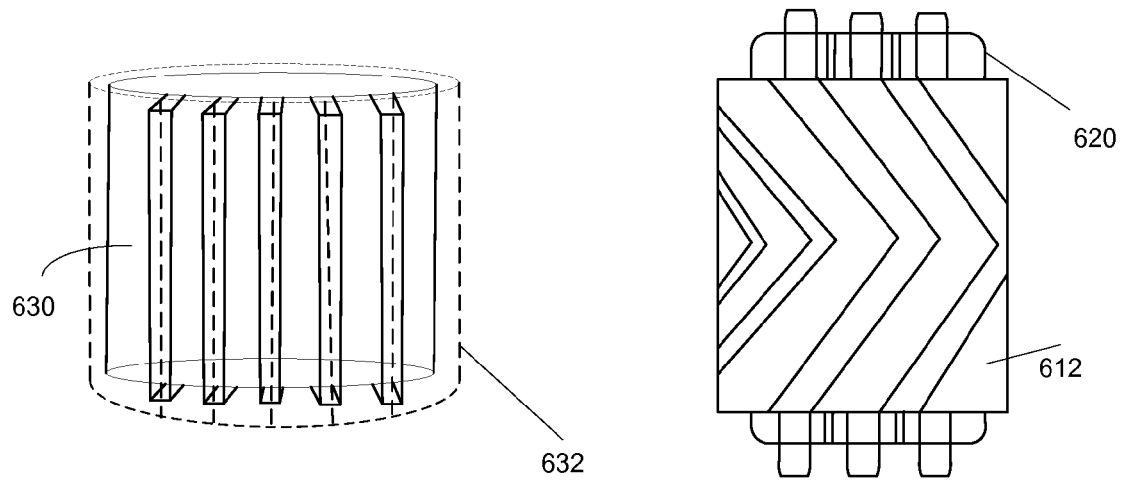
FIG. 6A illustrates a stator assembly and a rotatable component in a steady state according to one aspect of the present embodiments.

FIGS. 6A thru 6D illustrate(s) various motor components of a fluid dynamic bearing motor in both a non-operational and operational state. According to an embodiment, FIG. 6A illustrates a stator assembly 620, a sleeve 612, along with an induction housing 630 comprising a number of wires 632. For clarity of illustration, the housing 630 is illustrated separately. However, it is appreciated that the housing 630 may surround the sleeve 612 and the stator assembly 620.

During the non-operational mode of the fluid dynamic bearing motor, no current is generated within the stator assembly 620, and therefore no electromagnetic fields are formed. Thus, the stator assembly produces zero force throughout the motor during the non-operational mode. The housing 630 is at rest during the power off mode and is stationary with respect to the stator assembly 620.

Figure 6B:
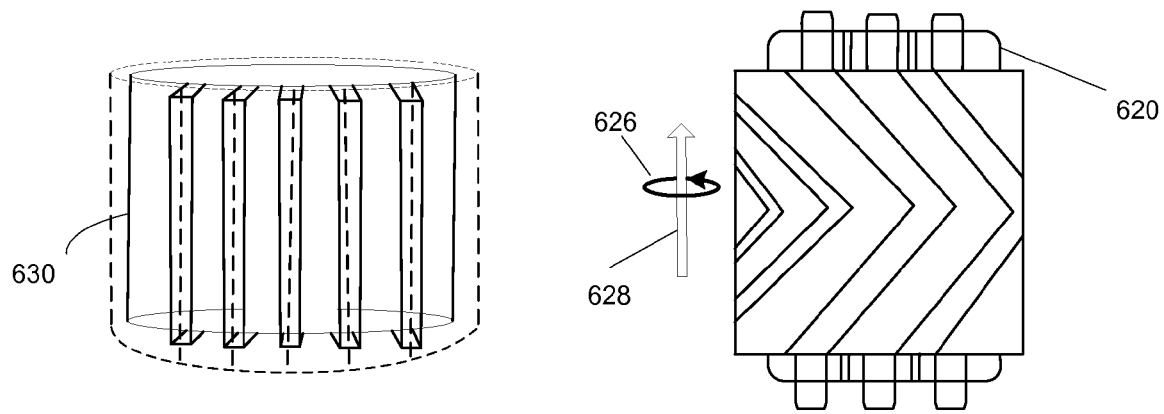
FIG. 6B illustrates a housing and a stator assembly in an operational mode according to one aspect of the present embodiments.

Next, FIG. 6B illustrates the fluid dynamic bearing motor during an initial power up mode. During the initial power up mode, a current 628 may flow through the windings of the stator assembly 620. The current 628 has a first rotating electromagnetic field 626 associated therewith. The rotating electromagnetic field 626 induces currents in the induction housing 630, which interacts with the rotating electromagnetic field 626. As a result, a force within the fluid dynamic bearing motor is generated, causing a repulsive force that establishes a bearing gap and a torque that causes a hub (not shown but see FIGS. 1-3) to rotate along with the induction housing 630 with respect to the stator assembly 620.

Figure 6C:
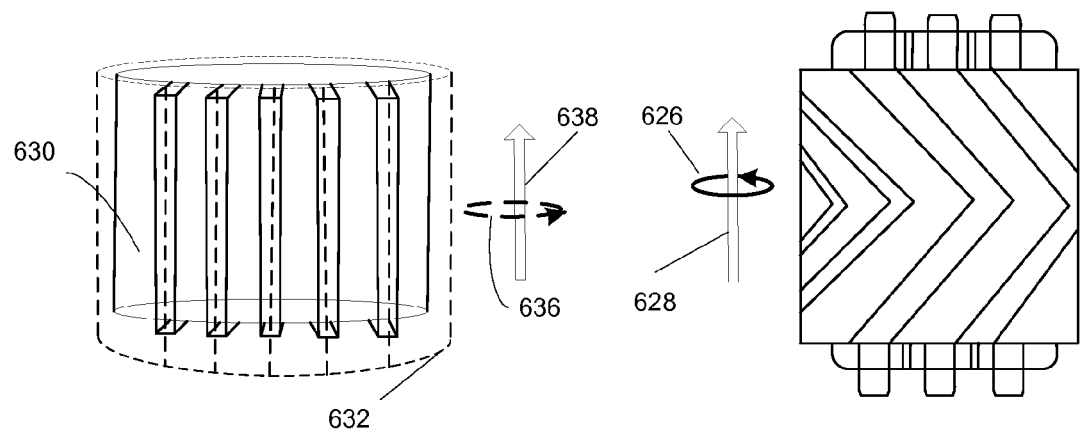
FIG. 6C illustrates a housing and a stator assembly with an electromagnetic force generated by the stator assembly according to one aspect of the present embodiments.
Figure 6D:
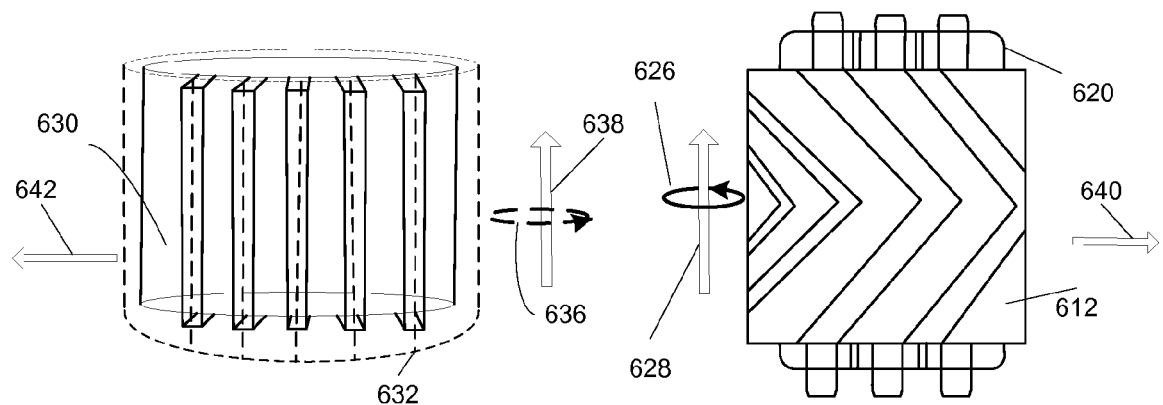
FIG. 6D illustrates a repulsive force generated between the housing and the stator assembly according to one aspect of the present embodiments.

Subsequently, as illustrated in FIG. 6C, the rotation of the induction housing 630 comprising wires 632 with respect to the stator 620 induces a current 638 within the wires 632. The induced current 638 has a second electromagnetic field 636 associated therewith. As a result, as illustrated in FIG. 6D, a first electromagnetic force 640 orients in a first direction while a second electromagnetic force 642 orients in an opposite direction of the first electromagnetic force 640. The opposing forces of the first electromagnetic force 640 and the second electromagnetic force 642 repel each other. The repulsive force increases stiffness within the fluid dynamic bearing motor.

Figure 7:
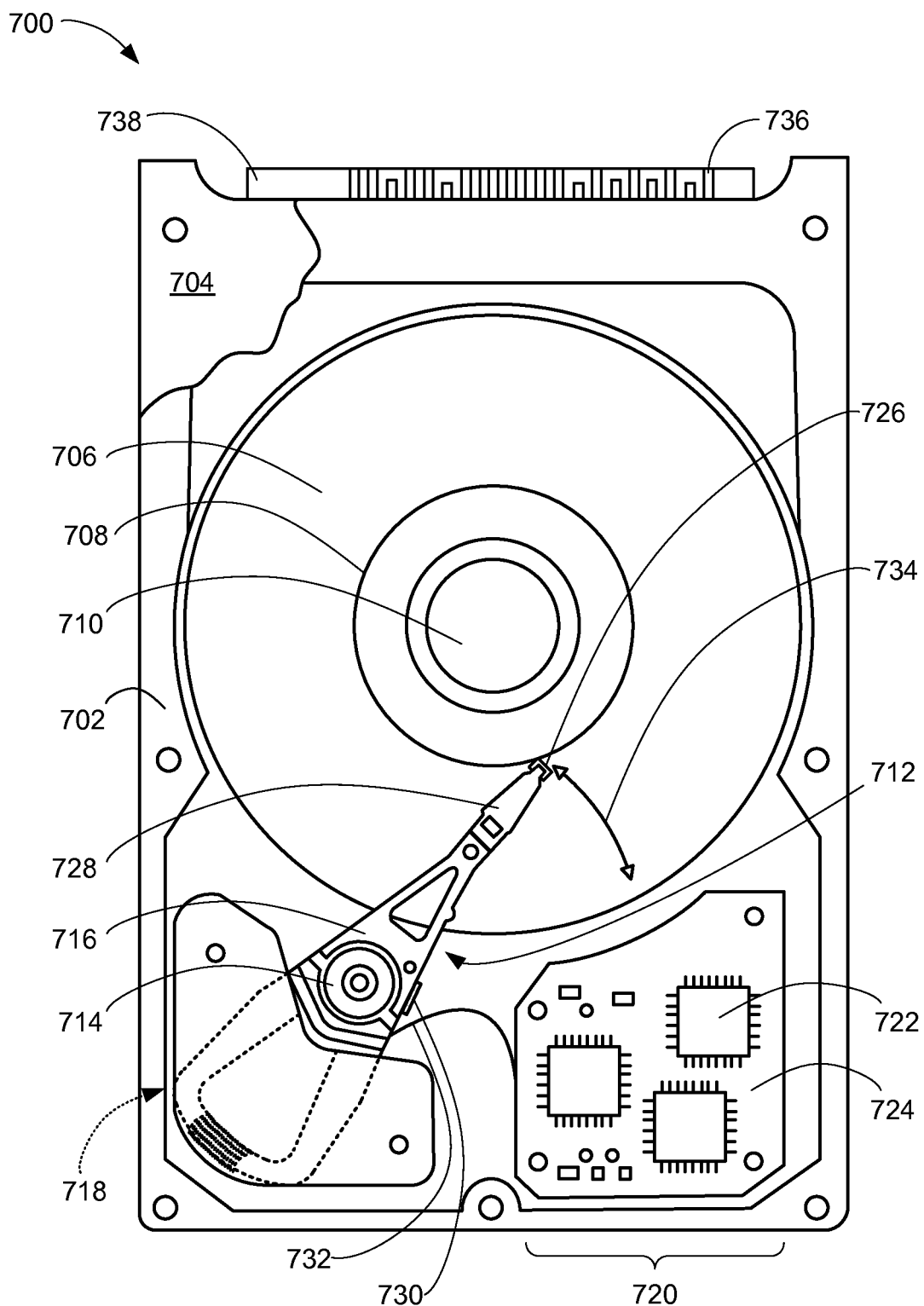
FIG. 7 illustrates a cross sectional view of a hard disk drive according to one aspect of the present embodiments.

FIG. 7 is a plan view of a data storage device in which an induction housing comprising a number of wires described herein may be used. In particular, an asynchronous motor, e.g., squirrel cage motor design, may be implemented to enhance stability within the data storage device by providing a more stable and stiffer bearing due to the repulsive forces generated during operation of the fluid dynamic bearing motor.

A disk drive 700 may be a hybrid drive, a hard disk drive, a removable media drive, a digital versatile disc, or a compact disc drive, to name a few. A disk drive 700 may generally include a base plate 702 and a cover 704 that may be disposed on the base plate 702 to define an enclosed housing for various disk drive components. The disk drive 700 includes one or more data storage disks 706 of computer-readable data storage media. Typically, both of the major surfaces of each data storage disk 706 include a number of concentrically disposed tracks for data storage purposes. Each data storage disk 706 is mounted on a hub 708 (also illustrated in FIGS. 1-3), which in turn is rotatably interconnected with the base plate 702 and/or cover 704. The induction housing as illustrated in FIG. 4 may be coupled to the hub 708 and configured to rotate along with the hub 708 during operation of the disk drive 700. As discussed with respect to FIGS. 1-6 above, current may be induced in the induction housing, resulting from the rotation of the induction housing with respect to the stator. The induced current generates a repulsive force between the induction housing and the stator assembly, thereby increasing stiffness. Multiple data storage disks 706 are typically mounted in vertically spaced and parallel relation on the hub 708. A spindle motor 710 rotates the data storage disks 706.

The disk drive 700 also includes an actuator arm assembly 712 that pivots about a pivot bearing 714, which in turn is rotatably supported by the base plate 702 and/or cover 704. The actuator arm assembly 712 includes one or more individual rigid actuator arms 716 that extend out from near the pivot bearing 714. Multiple actuator arms 716 are typically disposed in vertically spaced relation, with one actuator arm 716 being provided for each major data storage surface of each data storage disk 706 of the disk drive 700. Other types of actuator arm assembly configurations could be utilized as well, an example being an "E" block having one or more rigid actuator arm tips, or the like, that cantilever from a common structure. Movement of the actuator arm assembly 712 is provided by an actuator arm drive assembly, such as a voice coil motor 718 or the like. The voice coil motor 718 is a magnetic assembly that controls the operation of the actuator arm assembly 712 under the direction of control electronics 720.

The control electronics 720 may include a number of integrated circuits 722 coupled to a printed circuit board 724. The control electronics 720 may be coupled to the voice coil motor assembly 718, a slider 726, or the spindle motor 710 using interconnects that can include pins, cables, or wires (not shown).

A load beam or suspension 728 is attached to the free end of each actuator arm 716 and cantilevers therefrom. Typically, the suspension 728 is biased generally toward its corresponding data storage disk 706 by a spring-like force. The slider 726 is disposed at or near the free end of each suspension 728. What is commonly referred to as the read/write head (e.g., transducer) is appropriately mounted as a head unit (not shown) under the slider 726 and is used in disk drive read/write operations. The head unit under the slider 726 may utilize various types of read sensor technologies such as anisotropic magnetoresistive (AMR), giant magnetoresistive (GMR), tunneling magnetoresistive (TuMR), other magnetoresistive technologies, or other suitable technologies.

The head unit under the slider 726 is connected to a preamplifier 730, which is interconnected with the control electronics 720 of the disk drive 700 by a flex cable 732 that is typically mounted on the actuator arm assembly 712. Signals are exchanged between the head unit and its corresponding data storage disk 706 for disk drive read/write operations. In this regard, the voice coil motor 718 is utilized to pivot the actuator arm assembly 712 to simultaneously move the slider 726 along a path 734 and across the corresponding data storage disk 706 to position the head unit at the appropriate position on the data storage disk 706 for disk drive read/write operations.

When the disk drive 700 is not in operation, the actuator arm assembly 712 is pivoted to a "parked position" to dispose each slider 726 generally at or beyond a perimeter of its corresponding data storage disk 706, but in any case in vertically spaced relation to its corresponding data storage disk 706. In this regard, the disk drive 700 includes a ramp assembly (not shown) that is disposed beyond a perimeter of the data storage disk 706 to both move the corresponding slider 726 vertically away from its corresponding data storage disk 706 and to also exert somewhat of a retaining force on the actuator arm assembly 712.

Exposed contacts 736 of a drive connector 738 along a side end of the disk drive 700 may be used to provide connectivity between circuitry of the disk drive 700 and a next level of integration such as an interposer, a circuit board, a cable connector, or an electronic assembly. The drive connector 738 may include jumpers (not shown) or switches (not shown) that may be used to configure the disk drive 700 for user specific features or configurations. The jumpers or switches may be recessed and exposed from within the drive connector 738.

While embodiments have been described and/or illustrated by means of examples, and while these embodiments and/or examples have been described in considerable detail, it is not the intention of the applicant(s) to restrict or in any way limit the scope of the embodiments to such detail. Additional adaptations and/or modifications of the embodiments may readily appear in light of the described embodiments, and, in its broader aspects, the embodiments may encompass these adaptations and/or modifications. Accordingly, departures may be made from the foregoing embodiments and/or examples without departing from the scope of the embodiments. The implementations described above and other implementations are within the scope of the following claims.

What is claimed is:

1. An apparatus comprising:
   a stator assembly configured to generate a first electromagnetic field in response to a power supplied to the stator assembly, wherein the first electromagnetic field has a first force associated therewith;
   an induction housing configured to rotate relative to the stator assembly responsive to power being supplied to the stator assembly, wherein the relative rotation and the first electromagnetic field induce a current within the induction housing, the induced current generates a second electromagnetic field associated with the induction housing, the second electromagnetic field has a second force associated therewith, the induction housing is a squirrel cage motor with wires where the induced current flows in response to the relative rotation and further in response to the first electromagnetic field, and the first force and the second force are repulsive with respect to one another; and a hub configured to rotate with the induction housing about a fluid dynamic bearing.

2. The apparatus of claim 1 further comprising a sleeve and a shaft, wherein stator teeth of the stator assembly face an inner diameter of the housing, and wherein the sleeve is positioned on an inner diameter of the stator assembly, and wherein a gap between the sleeve and the shaft forms the fluid dynamic bearing.

3. The apparatus of claim 1, wherein the induction housing is a linear motor.

4. The apparatus of claim 1, wherein the induction housing is an asynchronous motor.

5. A device comprising:

a stationary component configured to generate a first electromagnetic field in response to a power supplied to the stationary component;

a rotatable component configured to rotate relative to the stationary component, wherein the relative rotation facilitates read and write operations to a storage component; and an induction housing coupled to the rotatable component, wherein the induction housing is configured to rotate with the rotatable component, the relative rotation and the first electromagnetic field induce a current within the induction housing, the induced current generates a second electromagnetic field associated with the induction housing, wherein the induction housing is a squirrel cage motor with wires where the induced current flows in response to the relative rotation and further in response to the first electromagnetic field, and the second electromagnetic field and the first electromagnetic field generate a repulsive force between the induction housing and the stationary component.

6. The device of claim 5, wherein the stationary component is a stator assembly configured to generate the first electromagnetic field in response to the power supplied to the stationary component.

7. The device of claim 5, wherein the rotatable component is a hub, a shaft, or a sleeve.

8. The device of claim 5, further comprising a sleeve and a shaft positioned on an inner diameter of the stationary component, wherein the stationary component faces an inner diameter of the rotatable component, and wherein a gap is formed between the sleeve and the shaft forms a fluid dynamic bearing.

9. An apparatus comprising:

a fluid dynamic bearing defined by a stationary component and a rotatable component;

a hub configured to rotate relative to the stationary component; and an induction housing, wherein a current is induced within the induction housing resulting from the relative rotation, wherein the induction housing is a squirrel cage motor with wires wherein the induced current flows in response to the relative rotation and further in response to a first electromagnetic field generated by the stationary component in response to a power supplied to the stationary component, and wherein the induced current generates a second electromagnetic field associated with the induction housing and wherein the second electromagnetic field has a force associated therewith, and the induced current creates a repulsive force between the stationary component and the hub.

10. The apparatus of claim 9, wherein the stationary component is configured to generate the first electromagnetic field in response to the power supplied to the stationary component, and wherein the first electromagnetic field has a force associated therewith.

11. The apparatus of claim 9 further comprising a sleeve and a shaft, wherein the stationary component faces an inner diameter of the induction housing, and wherein the sleeve is positioned on an inner diameter of the stationary component, and wherein a gap between the sleeve and the shaft forms a fluid dynamic bearing.

* * * * *